July 12, 1966  D. A. GUEY ETAL  3,260,549
MACHINE FOR ASSEMBLING BRUSHES
Filed July 31, 1964  11 Sheets-Sheet 1

July 12, 1966  D. A. GUEY ETAL  3,260,549

MACHINE FOR ASSEMBLING BRUSHES

Filed July 31, 1964  11 Sheets-Sheet 8

July 12, 1966  D. A. GUEY ETAL  3,260,549
MACHINE FOR ASSEMBLING BRUSHES
Filed July 31, 1964  11 Sheets-Sheet 11

United States Patent Office
3,260,549
Patented July 12, 1966

3,260,549
MACHINE FOR ASSEMBLING BRUSHES
Daniel A. Guey and Maurice A. Briez, Beauvais, France, assignors to La Brosse & J. Dupont Reunis, Paris, France, a company of France
Filed July 31, 1964, Ser. No. 386,669
Claims priority, application France, Aug. 2, 1963, 943,629
19 Claims. (Cl. 300—5)

The present invention relates to a brush-making machine and more particularly to a machine for simultaneously inserting into the body portion of a brush all the tufts of bristles of one row during a single rotation of the main shaft of the machine.

Machines of this general kind are already known, but they provide for inserting into the head of a brush a number of tufts disposed along a straight line parallel to the axis of said head or into a body portion of a larger brush, such as a clothes brush on a straight line directed transversely of the body.

In those machines wherein the tufts of bristles are held in their respective holes of the brush by means of keys made out of a flat wire, a plurality of wire bobbins and the necessary devices for feeding the wires must be provided, one for each hole of a row of tufts to be set. These bobbins and feeding devices are cumbersome and are a source of difficulties during the working of the machine. They duplicate the causes of breakdowns whenever one of the devices fails. Moreover, on account of the numerous wire bobbins the machines of the prior art are not designed for inserting more than six or eight tufts at each time.

Further, said machines are constructed for making one type of brush only and are not readily adapted to manufacture another type of brush. More particularly they are generally provided for setting the tufts along a straight line and are not adapted for setting tufts along a curved line.

It is an object of the present invention to provide a machine for inserting in one motion into a blank brush, already drilled with rows of holes or recesses for receiving the bristles, all the tufts of bristles of one row and to clamp the tufts by means of keys cut from a single wire.

Another object of this invention is to provide a machine of the type recited above for use wherein the holes or recesses in the blank are disposed either in a straight line or on a curved line.

Another object of this invention is to provide a machine for inserting in one movement all the tufts of bristles of one row by means of a particular interchangeable inserting mouthpiece, adapted for inserting with the tufts of bristles disposed in straight rows or along a curved path.

It is another object of this invention to provide in a machine of the type described an inserting mouthpiece provided with means for receiving from a transfer device bundles of bristles formed at the exit of a magazine or hopper, means adapted to receive from a cutting tool the keys necessary to clamp the bristles in the holes or recesses of the blank brush, and means to bend and double the bundles of bristles around the keys, and to cooperate with an inserting device to form tufts having looped ends which are inserted into the holes or recesses of the blank together with the keys which are pressed in edgewise.

Another object of this invention is to provide in a brushmaking machine comprising an interchangeable inserting mouthpiece, a vertically moving carriage for automatically transferring into the mouthpiece bundles of bristles formed at the exit of a magazine or hopper by means of a notched needle in a sliding movement, carrying the bundles above the mouthpiece.

Still another object of this invention is to provide a mounting arrangement for the inserting tongues of a brushmaking machine allowing for operatively clamping the same number of tongues as the number of tufts to be inserted by the particular mouthpiece mounted on the machine.

A further object of the invention is to provide, in a brushmaking machine of the type above described, a feeding means arranged and adapted to continuously feed bristles from a magazine or hopper to the transferring and inserting means and to replenish the magazine with bristles without stopping the machine.

The foregoing and other objects and advantages of the invention will become readily apparent from the ensuing detailed description of the machine considered in conjunction with the accompanying drawings wherein like reference numerals denote like parts throughout the various figures and wherein.

Before giving a full description of the improved brush-making machine, it is advisable to direct attention to the type of brush for which it has been designed.

Figures 1, 2, 3, 4, 5, 6:
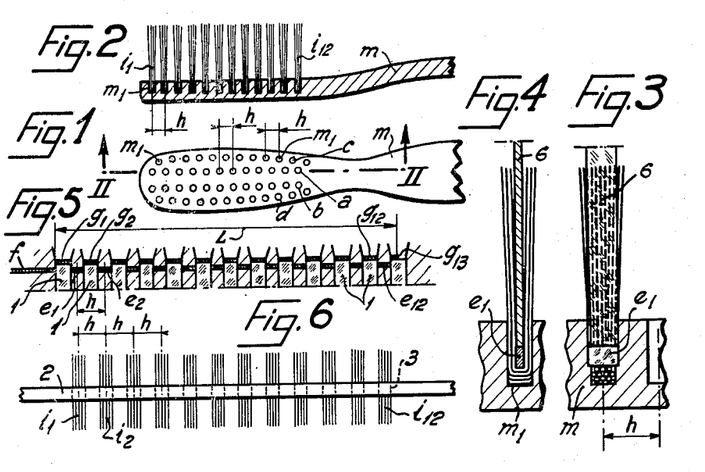
FIG. 1 is a plan view of a toothbrush head which can be assembled by the machine of the invention.
FIG. 2 is a cross section taken along line II—II of FIG. 1.
FIG. 3 shows on a larger scale, the last step of the operation of inserting a tuft of bristles into the head of the toothbrush shown in FIG. 2.
FIG. 4 is a view similar to FIG. 3, the section being made in a plane at right angles to a section of FIG. 3.
FIG. 5 is an enlarged schematic view showing how the keys, used for securing the tufts in the holes of the brush head, are cut.
FIG. 6 is a plan view, drawn to the same scale as FIG. 5, of the notched needle provided for forming the bristle bundles and carrying them to positions in alignment with the channels of the inserting mouthpiece.

Referring to FIGS. 1 and 2, there is shown a brush head comprising four rows of bristle tufts. The central rows $a$ and $b$ are rectilinear, whereas the marginal rows $c$ and $d$ are arcuate so that they exactly follow the contours of the brush edges.

Each of the tufts is made by bending a bundle of bristles against itself to form a looped end which is inserted in a hole or recess $m_1$, previously drilled in the head of the blank brush, and the bundle of bristles is then secured therein by means of a small wire or key $e_1$ which is force fitted into the hole $m_1$ (referring to FIGS. 3 and 4).

In the machine according to the invention, all the tufts of one row, for example, row $a$ shown in FIG. 2, are inserted and secured simultaneously in the holes $m_1$ of the said row by means of keys $e_1, e_2 \ldots e_{12}$.

In the drawings, it has been supposed that the machine was designed for simultaneously inserting twelve tufts of bristles in one row, but it is to be noted that the machine is of a versatile construction which allows the insertion of more or less than twelve tufts in a row by substituting only a small number of elements and the adjunction or withdrawal of inserting tongues as it shall be described in detail further. Also, it has been noted that the machine can be adapted for the insertion of tufts disposed along a curved path, such as rows $c$ and $d$ of FIG. 1, by changing only the inserting mouthpiece, which will be described later, and setting correctly the mouthpiece above the brush blank.

Briefly stated, the machine provides for cutting small rods from a flat wire (FIG. 5) by means of a series of punches 1 operating in such a manner as to cut up the wire $f$ to form waste material $g_1, g_2$, etc. and leaving therebetween portions of wire which constitute the rods. In order to be certain that rod $e_{12}$ may have exactly the same length as the other rods, a portion $g_{13}$ is cut as additional waste material. This piece may have a length less than that of the cut portions $g_1, g_2 \ldots g_{12}$. The punches 1 are distributed in such a manner that the rods $e$ are disposed with the distance between the axes $h$ corresponding to the distances between the axes of the apertures $m_1$ (FIGS. 1–5).

Figure 7:
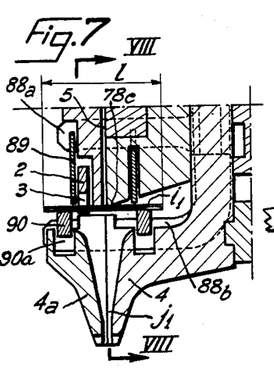
FIG. 7 is a side vertical section of the inserting mouthpiece showing the bundles of bristles maintained in the moving carriage before the transfer to the mouthpiece.
Figure 8:
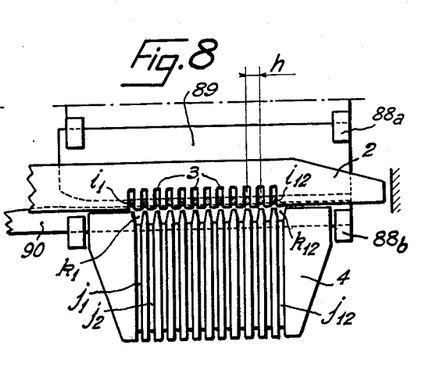
FIG. 8 is a section view taken along line VIII—VIII of FIG. 7.

The clusters of bristles $i_1, i_2 \ldots i_{12}$, which are to form the tufts are displaced into the insertion position, level with the apertures $m_1$ by a needle 2 (FIGS. 6–10) formed with notches 3 therein so distributed that the spaces between the axes equal the value $h$. The needle 2 is immobilized at the end of travel in a position wherein the clusters $i_1, i_2 \ldots i_{12}$ are disposed directly over the channels $j_1, j_2 \ldots j_{12}$ formed in an inserting mouthpiece 4 (FIGS. 7 and 8). The channels are disposed coaxially with the conduits 5, which are formed in the portion of the machine bearing the inserting mouthpiece 4. Each of the conduits 5 constitutes a guide in which, under the action of a tongue 6 (FIGS. 3 and 4), each of the rods $e_1, e_2 \ldots e_{12}$ is vertically downwardly displaced to act on the corresponding cluster of bristles folding the cluster into the form of a tuft and engaging the tuft in an aperture $m_1$ wherein the tuft is maintained in a secured position (FIGS. 3 and 4).

Thus, it will readily be perceived that, in order to provide for the simultaneous insertion and securing of the tufts $i_1, i_2 \ldots i_{12}$ of a row, it is necessary that each of the apertures $m_1$ of the mount $m$ be exactly opposite the corresponding channel $j_1, j_2 \ldots j_{12}$. In other words, it is necessary that the line of apertures $m$ of one row be disposed precisely in line with the axial projections of the channels $j_1, j_2 \ldots j_{12}$ of the inserting mouthpiece 4.

In order to produce a complete brush, the mount $m$ must be displaced into successive positions opposite the machine to provide for the simultaneous insertion of the tufts of a first and each subsequent row before passing to a machine such as those which are conventionally used for finishing.

For this purpose, the mount $m$ may be carried on a conveying chain traveling over a predetermined distance with stopping opposite a machine for the insertion of each row of tufts. The distance and the stops are determined in a manner which, when necessary, allows very precise adjustment of the position of the inserting mouthpiece 4 relative to the position wherein all mounts entrained by the chain will be successively immobilized for the purpose of receiving a row of tufts. In order to accomplish this, the frame 7 of the machine (FIGS. 13, 14 and 15) is disposed perpendicularly to the conveying chain indicated diagrammatically at 8. The frame 7 bears on a pedestal comprising four superimposed tiers, i.e., the base 9, two moving plates 10 and 11 and a plate 12 on which the frame 7 is secured.

Figure 14:
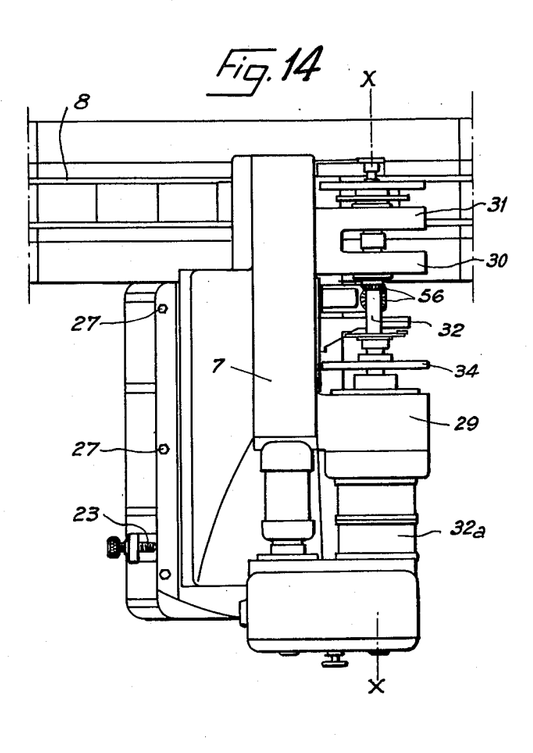
FIG. 14 is a plan view of the machine.
Figure 17:
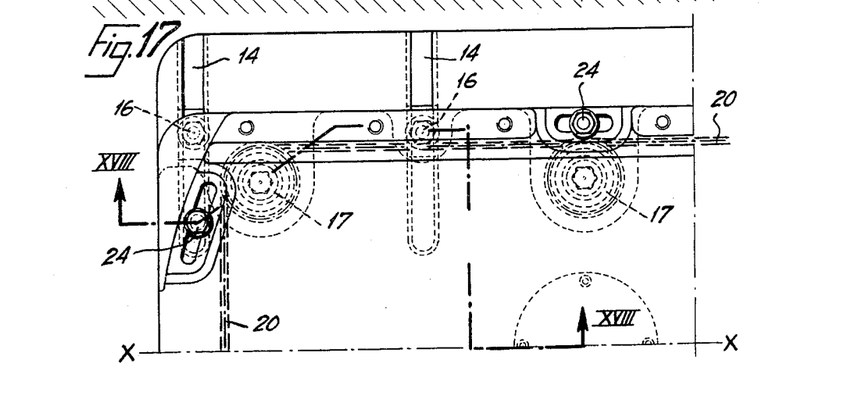
FIG. 17 is a partial plan view of the supporting stand for the machine.
Figure 18:
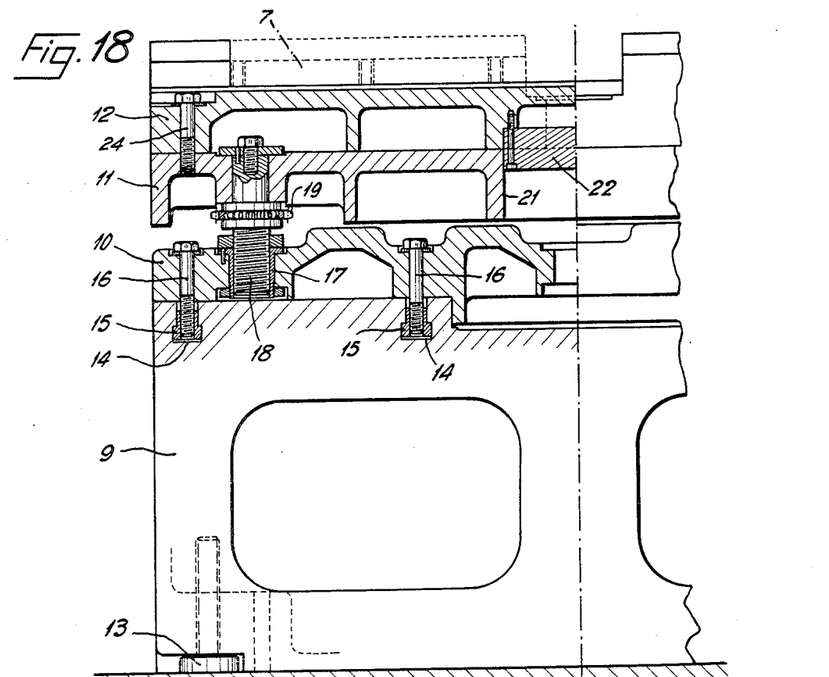
FIG. 18 is a section taken along line XVIII—XVIII of FIG. 17.

The base 9 is secured to the floor, after suitable leveling which may be facilitated by means of small jacks 13 (FIG. 18). The base has on its upper face inverted T-shaped grooves 14. A bush 15, forming a nut for a screw 16, is engaged in each of the grooves (FIG. 18). The bushes provide, by gripping action, for the locking of the plate 10 in the base 9 after adjustment of the relative positions of the two elements in a direction perpendicular to the longitudinal axis X—X of the machine (FIGS. 14 and 17).

The plate 10 comprises a series of sleeves 17 forming nuts for the screws 18, on each of which a chain wheel 19 is keyed. The wheels 19 are joined by a chain 20 engaged with a control wheel (not shown). When the control wheel is rotated, all of the screws 18 are simultaneously rotated and, depending on the direction of rotation, the ascent and descent of the plate 11 relative to the plate 10 is produced.

Figure 13:
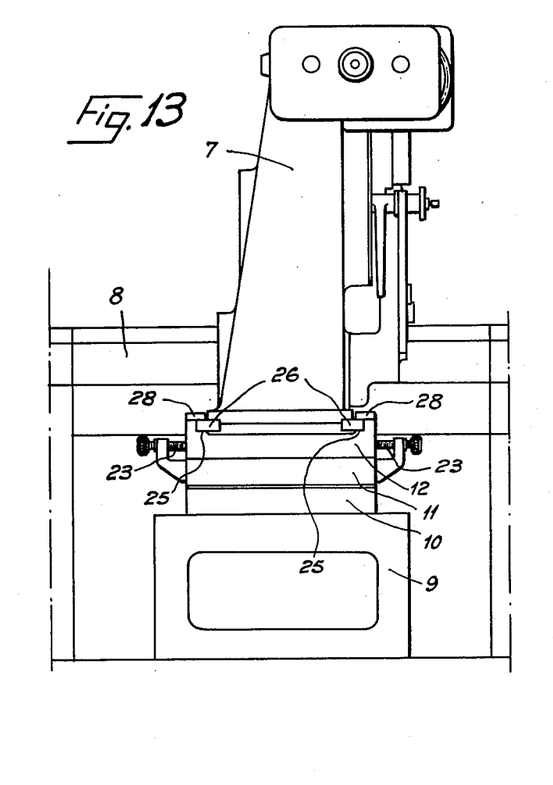
FIG. 13 is an elevation of the rear face of the machine.
Figures 15, 16:
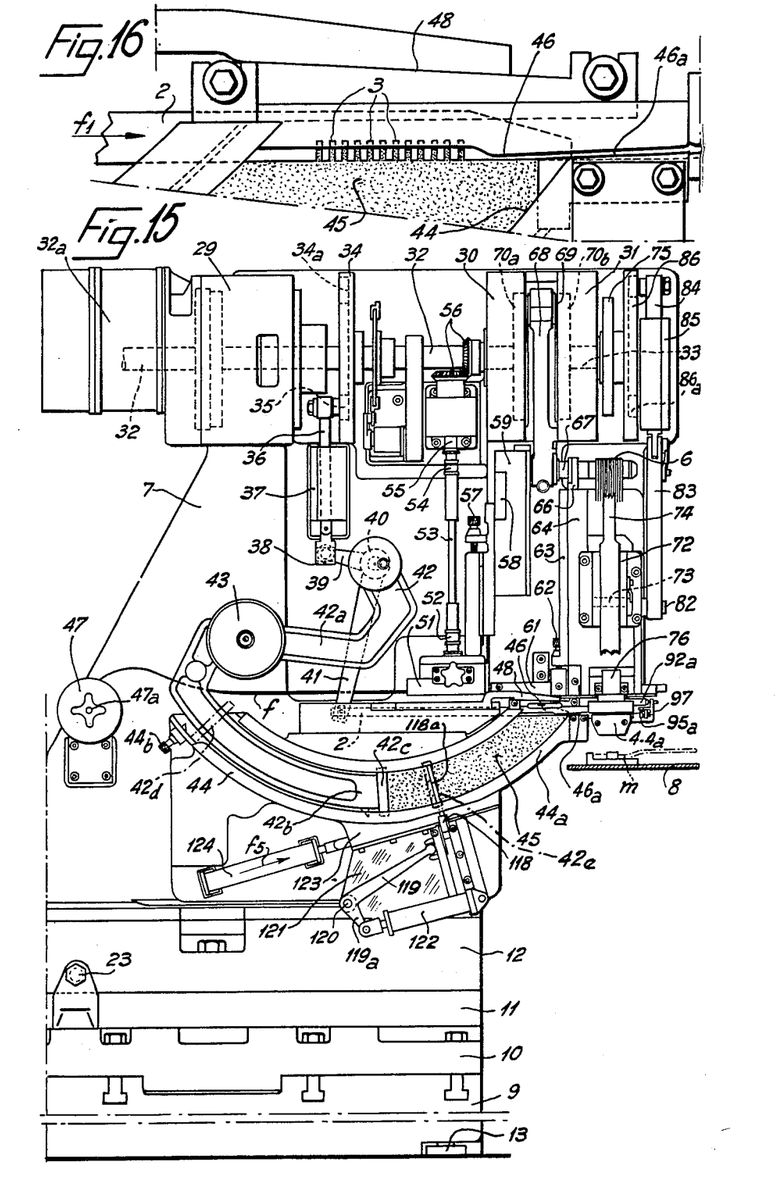
FIG. 15 is a view, on a larger scale, of the front portion of the machine as seen in elevation.
FIG. 16 shows a large scale detail of FIG. 15 comprising the notched needle located at the exit of the magazine.

The plate 11 is formed with a central bore 21 in which is engaged a pivot 22, carried on the plate 12. The pivot allows for the angular displacement of plate 12 relative to the plate 11. The angular displacement of the plate 12 may be produced with precision by means of abutment screws 23 carried on the plate 11 (FIGS. 13 to 15). The screws 23 are eccentrically arranged relative to the pivot 22. When the designed angular adjustment has been achieved, the locking of plate 12 relative to the plate 11 and to the base 9 is effected by tightening the screws 24.

The plate 12 has therein slideways 25 over which the guiding rails 26, fastened within the frame 7, can move so that the frame may be displaced relative to the plate 12, and consequently to the base 9, along the axis X—X, i.e., perpendicularly to the conveying chain 8. The locking of the frame 7 in the desired position is obtained by tightening the screws 27 in locking shoes 28, to clamp the guide rails 26 in the slideways 25.

Due to the four-tiered assembly, the inserting mouthpiece 4 of the machine can be displaced, in a horizontal plane, both parallel to the longitudinal axis X—X of the machine and perpendicularly to the axis as well as angularly dispaced about a vertical axis, (the axis of the pivot 22). The mouthpiece may furthermore be displaced vertically by means of nuts and screws 17 and 18, respectively.

The frame 7 has, on its upper portion, housings 29, 30 and 31, which form bearings to support a main shaft 32 and a coaxial shaft 33 (FIG. 15). The main shaft 32 is driven by a motor 32a which includes a reducing device, a clutch and a brake, all are of a known type, and therefore have not been shown.

Keyed on the main shaft 32 is a cam 34 having therein a groove 34a which engages with a roller 35 mounted at one end of an arm 36. The arm 36 slides in a bearing 37, and has articulated to another end a block 38 which is pivotally attached to one end 39 of a bell crank. The bell crank is pivotally mounted on a fixed pivot 40. The other arm 41 of the bell crank is articulated to the needle 2 which feeds the bristles to the inserting mouthpiece. Also, pivotally mounted on the fixed pivot 40 is an arm 42. The arm 42 is weighted by a counterweight 43, the position of which is adjustable on the rectilinear portion 42a of the arm.

The lower end 42b of the arm is of circular shape and terminates in a head portion 42c which is engaged in a member 44 of circular shape. Member 44 is concentric with the pivot 40 and has a U-shaped section. The member 44 constitutes a magazine containing the mass 45 of bristles intended to form the tufts. The bristles are rectilinear and are cut to a length 1 (FIG. 7) such as is necessary for the formation of tufts. The bristles are horizontally disposed and the ends thereof bear against the vertical end case of the magazine 44. The position of the end face relative to the front edge 44a of the magazine is adjustable, depending on the length 1 of the bristles. The latter vary in length in accordance with the type of brush to be manufactured.

Due to the action of the counterweight 43, the head 42c urges the mass 45 of the bristles into abutment against the lower portion of the needle 2. The bristles will penetrate into the notches 3 in the needle (FIGS. 16).

The profile of the groove 34a, in the needle controlling cam 34 is determined in such a manner, that the needle, at the beginning of its travel in the direction $f_1$ for supplying the bristles to the inserting mouthpiece 4, effects a multiplicity of small alternative displacements of the needle in the direction $f_1$ and in the opposite direction. This alternating movement of the needle causes the bristles to fill the various notches 3 in a super abundant manner. The proportioning of the bristles, i.e., the quantity of the bristles necessary for the formation of a tuft is determined in respect for each notch 3 by means of a stop 46 which defines an outlet passage 46a (FIG. 16). The height of the passage may be adjusted by means of inclined ramps 48 provided upon moving members.

Figure 19:
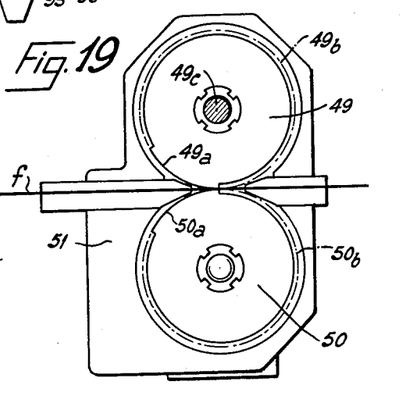
FIG. 19 is an enlarged schematic horizontal view of the wire-feeding device.

The flat wire $f$ from which the small rods $e_1$, $e_2$ etc. are cut, is supplied from a reel 47 mounted loosely on its support shaft. The rotation of the reel 47 can be controlled by an adjustable brake means 47a. The entrainment of the wire is effective in intermittent manner by means of two small wheels 49 and 50 (FIG. 19) disposed in a housing 51. Circular bosses 49a and 50a are formed on the periphery of the small wheels. The circumferential length of the bosses is equal to the length L of the wire $f$ necessary for forming all the rods $e_1$, $e_2$ . . . $e_{12}$, which are cut out in the manner previously discussed in reference to FIG. 5.

The two small wheels 49 and 50 are coupled by engaging means 49b and 50b. The shaft 49c of the wheel 49 is connected by a universal joint 52 to a shaft 53. The other end of shaft 53 is connected through a universal joint 54 to a shaft 55 which is driven by the main shaft 33 by means of bevel gears 56. The ratio of the bevel gears is such that one revolution of the shaft corresponds to one revolution of the wheels 49 and 50.

Figure 20:
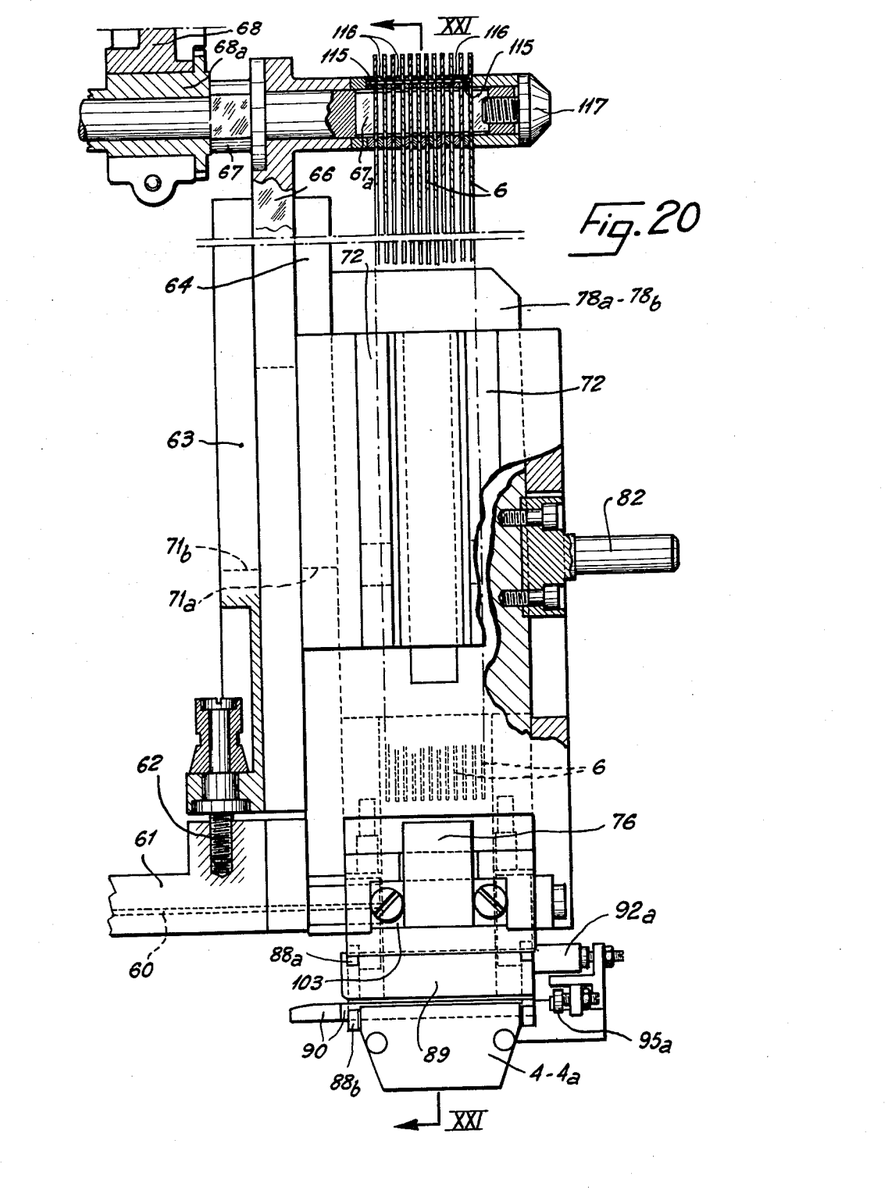
FIG. 20 is an enlarged detail view, with parts broken away, of the portion of FIG. 15 showing the inserting device and the interchangeable mouthpiece.

The height of the housing 51 is adjustable by means of a screw 57. It is also adjustable in the direction perpendicular to the axis X—X of the machine by means of a slideway 58 formed in a prolongation 59 of the frame 7 of the machine. At the outlet from the housing 51, the wire $f$ is guided to entry into the punching device by a conduit 60 provided in a member 61. The height of member 61 is adjustable by means of a screw 62 carried in a plate 63 fixed to the housing 64 which is secured to the frame 7 of the machine (FIGS. 15 and 20).

Figure 22:
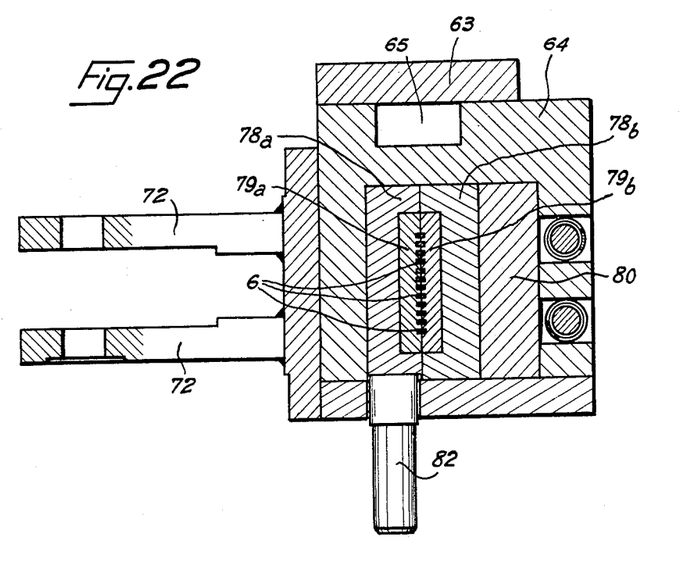
FIG. 22 is a horizontal section taken along line XXII—XXII of FIG. 21.

The housing 64 is formed with a vertical groove 65 laterally closed by the plate 63 (FIG. 22). A pin 66 is slidingly engaged in groove 65. Pin 66 is also fastened to a pivot 67 carried at the end of a connecting rod 68. The head of rod 68 is attached to a crank pin 69 connecting a pair of disc plates 70a and 70b. The plate 70a is keyed on the main shaft 32 and the plate 70b is keyed on the main shaft 33 which is thus driven by the shaft 32. The assembly of members 32, 70a, 69, 70b and 33 constitutes the coaxial crank shaft.

Secured to the pivot 67 are the tongues 6 which will be described later. The tongues are thus subjected to an alternating vertical movement the upper dead center of which corresponds to the position indicated in FIG. 15. The precise adjustment of the travel of the tongues may be effected due to the eccentric mounting of the pivot 67 in the bearing 68a at the lower end of the connecting rod 68.

Figure 21:
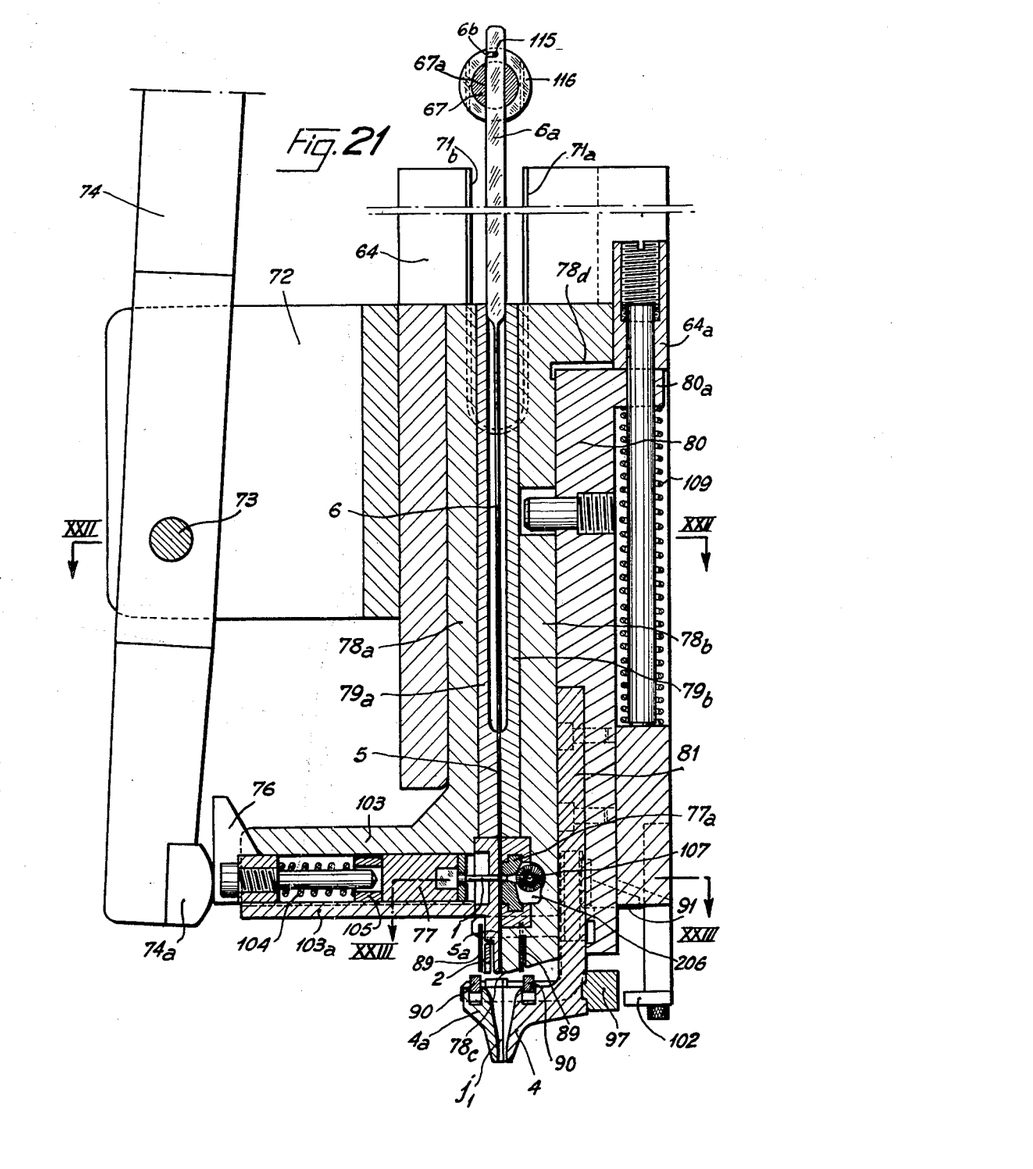
FIG. 21 is a vertical section taken along line XXI—XXI of FIG. 20.
Figure 23:
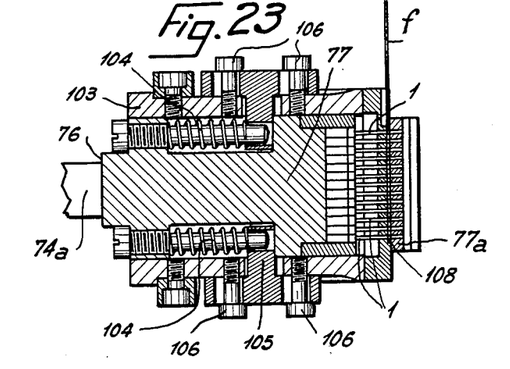
FIG. 23 is an enlarged cross section taken along lines XXIII—XXIII of FIG. 21 showing the key punching device.

The housing 64 and the plate 63 are formed with grooves 71a and 71b respectively for permitting the passage of the pivot 67 during its alternating travel. Secured on the front face of the housing 64 are two lugs 72 carrying a pivot 73. A lever 74 is articulated on pivot 73. The upper end of lever 74 bears against the contours of a cam 75 which is keyed on the shaft 33. The lower end 74a is applied against the head 76 of a block 77 carrying the punches 1 (FIGS. 15, 21, and 23).

Disposed within the housing 64 is an assembly of members 78a, 78b, 79a, 79b, and 80 thereinafter referred to as the mobile part. The member 80 is integral with the vertical prolongation portion 81 of the inserting mouthpiece 4.

Formed in the mobile part are the conduits 5 in which are disposed the tongues 6. This design involves the use of four members assembled to form an assembly which is justified only by machining considerations. It is for this reason that only the mobile part will be discussed in the remainder of the description.

Secured to the mobile part is a finger 82 forming a pivot for one end of a connecting rod 83. The other end of rod 83 is articulated to a slide member 84 mounted in a slideway 85. Slide member 84 also carries a roller engaged in a groove 86a formed in a plate 86. The groove 86a constitutes a cam bringing about the alternating displacement of the slide member 84 and consequently also that of the aforesaid mobile part.

Figure 24:
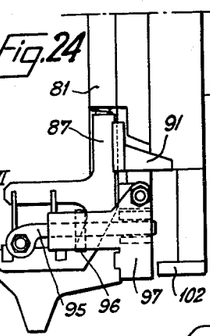
FIG. 24 is a side view of a portion of FIG. 20 showing the controlling device for locking the guide rails supporting the bundles of bristles above the inserting mouthpiece.
Figure 25:
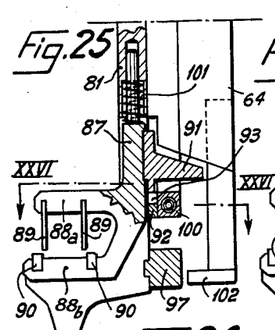
FIG. 25 is a section, with parts broken away, taken along line XXV—XXV of FIG. 26 showing the locking device in detail.
Figure 26:
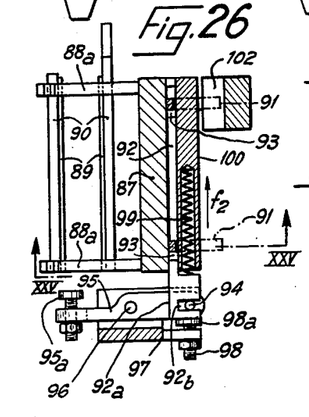
FIG. 26 is a cross section taken along line XXVI—XXVI of FIG. 25.
Figure 27:
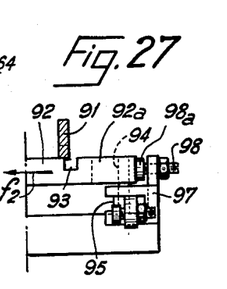
FIG. 27 is a schematic view showing the locking device in detail.

Associated with the prolongation 81 of the inserting mouthpiece 4 is a moving arrangement consisting of a vertical plate 87 from which extend two upper extension bars 88a and two lower extension bars 88b (FIGS. 24 to 26). The extension bars 88b, support rails 90 and the extension bars 88a support counter rails 89. Secured to the plate 87 are two stops 91 bearing at their lower portions against a slide 92 formed with two notches 93 having the same spacing as the stops 91. The latter bear halfway on the upper face of the slide 92 at the position of the notches 93 (FIGS. 26 and 27).

The slide 92 projects laterally at 92a externally of the mobile part, i.e., externally of the member 78b (see FIG. 20). The end of the slide is formed with a slot 92b. Engaging the slot 92b is a finger 94 carried on a lever 95 pivoting about pivot 96 on a support 97 fixed to the mouthpiece 4. The support 97 carries a screw 98, one end 98a of which forms a stop for limiting the travel of the slide 92. The slide 92 is biased by a spring 99 disposed in a bore formed in boss 100 on the prolongation 81 of the mouthpiece 1. The plate 87 is subjected to the action of the springs 101 disposed in bores in the prolongations 81. The springs apply stops 91 in abutment against the slide 92 and bring about the engagement of the stops 91 and notches 93 when the latter are shifted (as described later) by displacement of the slide into a position opposite the stops. Housing 64 comprises an abutment 102 (see also FIG. 21) disposed directly above the end of one of the stops 91.

The block 77 carrying the punches 1 (FIGS. 20, 21, and 23) is slidably mounted in horizontal prolongation 103 of the member 78a of the mobile part and is subjected to the action of return springs 104 which bear against the shoulders of the block 77 and against the abutments 105. The position of the abutments are adjustable relative to the sliding direction of the block 77. The immobilization of the elements is effective by the screws 106. The abutments constitute means for limiting the travel of the block 77 and permit the arrangement of the block in the correct position relative to the end 74a of the control lever 74. The fixed travel of the lever 74 is determined by the profile of the cam 75.

The punch assembly 1 may be readily dismantled for sharpening or replacement of the punches by separating the baseplate 103a from the prolongation 103.

Disposed opposite the block of punches 1 is the counterpart thereof 77a comprising orifices, the section of which correspond to that of the punches. The orifices open out into a channel 206 (FIG. 21) into which drops the punching waste material $g_1$, $g_2$, $g_3$, etc. In order to assure removal of this waste material, a rotary brush 107 is provided extending along the entire length of the punching block. The brush is mechanically driven in rotation and contacts the ends of the punches so as to remove the waste material. Furthermore, the vacuum source may be connected to the channel to assist the action of the brush and to feed the waste material to a receiving container disposed externally of the machine.

The wire $f$ is guided and maintained in the punching unit or block by a groove 108 which intersects the conduits 5 constituting the guides in which the tongues 6 slide. The conduits are prolonged at 5a as far as the base of the mobile part where each opens out opposite a conduit $j_1$, $j_2$ etc. provided in the inserting mouthpiece 4. The latter comprises a counterpart 4a designed in two parts of the mouthpiece to facilitate the machining of the conduits $j_1$, $j_2$, etc.

Figure 28:
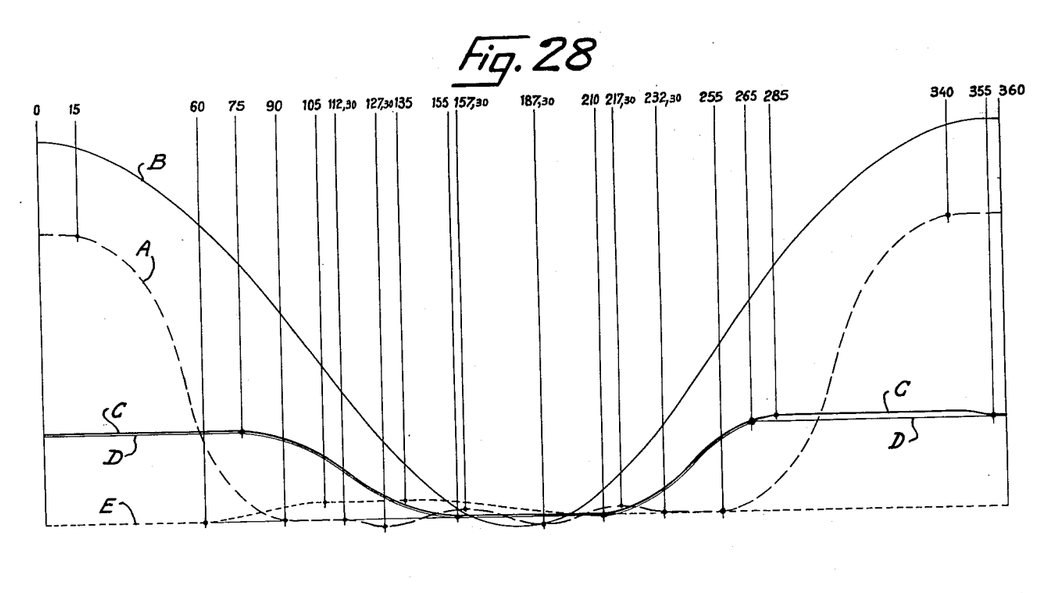
FIG. 28 is a diagram showing the relative movements of five moving members, i.e., the notch needle, punches, inserting tongues, inserting mouthpiece, and the moving guide part for the tongues and keys, plotted against the rotation angle of the main shaft, as they cooperate for the simultaneous insertion of the tufts of bristles into all the holes of one row of the body of a brush.

The operation of the machine described hereinabove is as follows:

The complete cycle is effected during a rotation of the main shaft 32 (and of the coaxial shaft 33) through 360 degrees. It is diagrammatically illustrated in FIG. 28.

Figure 10:
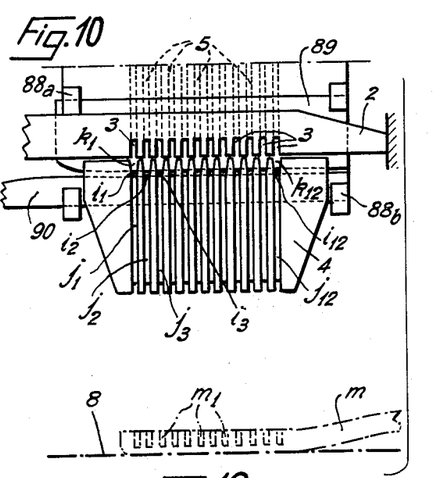

At the commencement of the cycle, (0°) the needle 2, the movement of which is shown diagrammatically by the curve A, is immobilized due to the outline of the groove in the cam 34 (FIG. 15), in the inserting mouthpiece 4 at its end of travel position (shown in FIG. 10). At this point (0°) the tongues 6, entrained by the connecting rod 68, are at the upper dead center point of their alternative travel. The movement of the tongues is shown diagrammatically by means of the sinusoidal curve B.

The mobile part, subjected to the action of the groove in the cam 86a and the movement of which is diagrammatically indicated by the curve C, is immobilized at the upper dead center of its travel in order that there may be no interruption between the continuity of the conduits 5, 5a, and the conduits $j_1$, $j_2$ . . . $j_{12}$ (or their inlet $k_1$ . . . $k_{12}$) formed in the mouthpiece 4 (part 78 in contact with the member 80) see FIG. 21. The inserting mouthpiece 4, curve D, is immobilized at the upper dead center of its travel, this mouthpiece being fixed to the member 80 (FIG. 21).

The introduction of the flat wire intended to form the small rods is effected, by the bosses 49a and 50a of the two small wheels 49 and 50, during the phase comprised between the point 0° and the point 60° of the cycle. The wire feeding phase is variable according to the length of the wire desired; however, the maximum length of this cycle is 60°.

The punch block 77 controlled by the cam 75 is also immobilized in its outermost withdrawal position (curve E).

When the shaft 32 has rotated through 15°, the needle 2 begins its return travel (opposite that direction of $f_1$). The travel takes place during the rotation from 15° to 90° of the shaft 32.

At 60° after the commencement of the cycle, the punches 1 commence their advance movement to form the small rods $e_1$, $e_2$ . . . etc. The punching of the wire $f$ being effected between 60° and 105° of the cycle, whereafter the punches are immobilized at the end of their forward travel during the phase 105° to 135°. They are then withdrawn between 135° and 210° and are immobilized at the rearward end of their travel (curve E).

Figure 12:
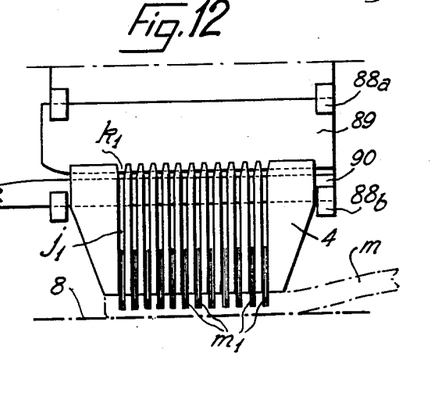

During the punching phase, the assembly comprising the mobile part and the inserting mouthpiece is entrained downwardly in order that the base of the inserting mouthpiece be displaced to a point as near as possible to the upper face of the mount $m$. During this descent, the mouthpiece 4 passes from the position indicated in FIG. 10 to the position illustrated in FIG. 12. The end of this travel is at 155° from the cycle commencing point of 0°.

Figure 11:
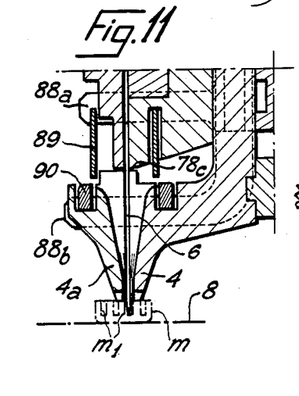

The curve B is such that the insertion tongues 6 act at this instant, 155°, on the rods $e_1$, $e_2$ . . . etc. (FIG. 11) so as to depress into the apertures $m_1$, the tufts $i_1$, $i_2$ . . . previously transferred from the magazine 44 to the inserting means 4 during the preceding end of the cycle movement as will be described later. Then the said tongues commence their ascending travel which is completed after one revolution of the shaft 32.

During this phase of the insertion of the tufts constituting a row, the needle 2 is subjected to alternating advancing and withdrawing movements which take place between the point at 122°30′ and the point 232°30′ (curve A). The purpose of these movements is to insure the suitable distribution of the bristles in the notches 3, as indicated hereinabove with reference to FIG. 16.

Starting from the point 210° of the cycle, the mobile part, entrained by the groove cam 86a, travels upwardly. The member 80, urged by the springs 109 (FIG. 21) interposed between the lugs 80a on the member 80 and the fixed housing 64, accompanies the mobile part until the instant at which the upper face of the lugs 80a encounter the stops 64a. The mobile part continues its travel, as determined by the profile of the cam 86a, and reaches the upper dead center of its travel at the point 285° of the cycle. The member 80 is immobilized at the point 265°.

The profile of the cam 86a is circular from a point 285° to the point 340° so that the mobile part and the inserting mouthpiece 4 remain immobile during this period of the cycle.

Starting from the point 255° of the cycle, the transfer of the bristle tufts from the magazine to the inserting means takes place. This transfer is effected by the needle 2 together with the rails 90 and the counterrails 89 carried by the moving arrangement 87, 88a and 88b. At the point 255° of the cycle, the needle 2 commences its advance movement in the direction $f_1$ so as to displace the clusters of bristles $i_1$, $i_2$ . . . to a position opposite the channels $j_1$, $j_2$ . . . in the mouthpiece 4. During this movement, the bristles engaged in the notches 3 of the needle are entrained thereby as far as the inserting means. At the output of the passage 46a, each tuft maintained in the corresponding notch of the needle is conveyed on the rails 90 of the mobile arrangement occupying its upper position and is maintained applied against the rails by the counterrails 89.

Slightly before the point 340°, the needle 2 has reached the position indicated in FIG. 8. At the point 340°, the needle is at the end of its travel (FIG. 10). At the end of its travel, the needle 2 abuts against the head 95a of a screw carried by lever 95 (FIG. 26). This brings about the angular displacement of the lever and consequently the displacement in a direction $f_2$ of the slide 92 against the action of the spring 99. The notches 93 are, due to this, displaced to a point opposite the stops 91, fixed to the plate 87 and forming a part of the moving arrangement. The result of this movement is to free the plate 87 which, under the action of the springs 101, descends entraining the rails 89 and 90 and engaging them with the slots 90a of the mouthpiece and consequently also the tufts of the bristles $i_1$, $i_2$ . . . are engaged in the notches 3 of the needle. Thus, the tufts or clusters descend and are immediately engaged in the grooves $k_1$, $k_2$ . . . constituting the inlets of the channels $j_1$, $j_2$ of the mouthpiece 4 (FIGS. 9 and 10).

The cam 86a brings about the downward entrainment of the moving part from the point 340° to the point 355° at which point the profile of the cam again becomes circular.

Figure 9:
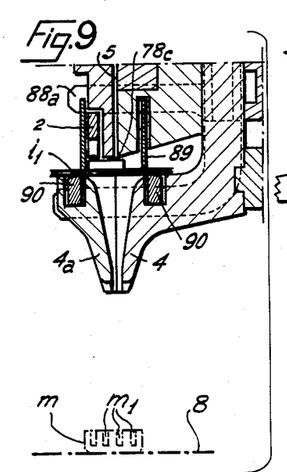
FIGS. 9, 10, 11 and 12 are views similar to those of FIGS. 7 and 8 respectively showing two stages of the inserting operation.

During this small portion of the cycle, the lower end 78c of the member 78b of the moving part is displaced into contact with the upper part of the mouthpiece 4 (FIG. 9). The result of this being to displace the lower ends of the channels 5a for guiding the tongues directly into communication with the grooves $k_1$, $k_2$, $k_3$ . . . thus insuring continuity in the guiding of the rods $e_1$, $e_2$ . . . urged by the tongues 6.

This travel of the member 78b is provided to correspond to the distance between the lower face 78d of a flange of the member 78b and the upper face of the lug 80a (FIG. 21) so that, when the profile of the cam 86a becomes effective starting from the point 75° of the following cycle to bring about the lowering of the moving part, the member 80 will be entrained simultaneously to contact a mount $m$ at the 155° point of the second cycle.

Slightly before the 155° point, one of the stops 91 will encounter the abutment 102 carried on the fixed housing 64. In this way, resetting the locking system of the plate 87 is accomplished by disengaging the base of the stop 91 from the notches 93 whereupon the spring 99 operates to restore the slide 99 to its original position, i.e., the position for locking the plate 87.

It should be pointed out that, during descending movement of the moving part, the advance phase of the punches has commenced. These conjugated movements are possible due to the fact that the part 76 of the slide 77 of the punch unit has sufficient height (FIG. 21) to remain in contact with the end 74a of the lever 75 during the downward travel of the moving part and of the mouthpiece.

In the case wherein the tufts of one row are to be inserted in apertures distributed along a curved line, use is made of inserting mouthpieces appropriately adapted to this arrangement.

Figure 29:
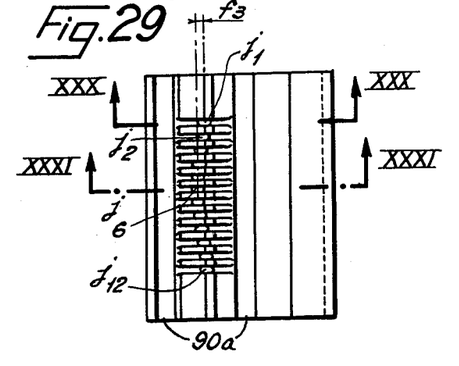
FIG. 29 is a plan view of an inserting mouthpiece designed for the simultaneous insertion of the tufts of bristles in the recesses of the head of a brush, when the apertures are disposed along a curved line defined by the contour or edges of the head.
Figure 30:
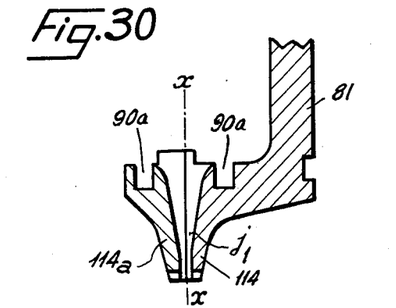
FIGS. 30 and 31 are vertical sections taken along lines XXX—XXX and XXXI—XXXI, respectively, of FIG. 29.

FIG. 29 shows a mouthpiece intended for the insertion of twelve tufts and comprising, for this purpose, twelve channels $j_1$, $j_2$, $j_3$ . . . $j_{12}$. In this figure, in order to more clearly illustrate the arrangement of the mouthpiece of this kind, the arrow $f_3$ indicating a curvature (FIG. 31) has purposely been exaggerated.

The mouthpiece consists of two parts 114 and 114a. The vertical plane X—X of assembly of these two parts defines the plane in which the axes of the inlets of all channels $j_1$, $j_2$ . . . $j_{12}$ are aligned.

Figure 31:
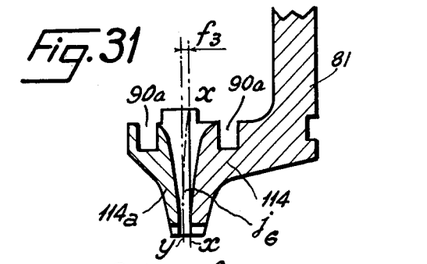

The intermediate channels between the outermost channels $j_1$, $j_{12}$ have respectively a surface of symmetry which is perpendicular to the plane of FIG. 31 and is represented in the figure by the curved line X–Y indicated for the channel $j_6$.

The special shape of the channels, in each one of which the tufts urged by the rod entrained by tongue 6 circulate, is permitted due to the flexibility of the tongues, which are preferably made of high-strength spring steel and have the shape of a needle, as illustrated in FIG. 21. The upper portion of the tongues 6 is widened as shown in 6a. It is engaged in a central groove 67a formed in the pivot 67 and is retained in place by a catch 115 inserted on a washer 116 forming a spacer between two consecutive tongues, the catch being engaged in a notch 6b formed in each tongue. The stack of washers and tongues is gripped by a screw 117 engaged in the end of the pivot 67 (see FIG. 20). This mode of assembly permits the putting into operation the desired number of tongues.

With the machine such as described hereinabove, it is possible to manufacture brushes comprising different numbers of tufts and involving different pitches and heights. To this end, use is made of the following:

The means for the adjustment of the position of the end face of the magazine 44 relative to its front face 44a; small wheels 49 and 50, the active contours of which determine the value of the length L (FIG. 5); the needle 2 having therein a number of notches 3 equal to the number of the tufts to be placed in a row; a punching unit and a counterpart both adaptable to the number and pitch of the small rods to be cut; pairs of members 79a and 79b formed with grooves 5 of the desired number and spacing; and finally, an inserting mouthpiece of the type referenced 4–4a or 114–114a having therein conduits corresponding to the points at which it is desirable to place the tufts in the mount $m$.

According to a special feature of the invention with a view to permitting the continuous running of a machine, i.e., without stopping for replenishing the bristle magazine, there is another device for urging the bristles towards the needle 2. The action of the device is temporarily substituted for the action of head 42c which can then be displaced to the position indicated in the broken lines 42d, in which position it is maintained by locking means 44b. The interior of the magazine passage 44 is readily accessible when the head 42c is locked at 42d. The abovementioned device comprises a series of needles or fine blades 118a mounted as the prongs of a fork at an angle at the end of a slide 118. An arm 119 of an angle, pivoted at 120 on a plate 121, is connected to the slide. The other end 119a of the bell crank is connected to a pneumatic cylinder 122 which is mounted on plate 121. The plate 121 comprises a base slidably mounted in a fixed support 123. The said base is articulated to the end of the piston of a second pneumatic cylinder 124 attached to a fixed point of the machine frame.

When the head 42c reaches the position indicated in broken line (at 42e in FIG. 15) the piston of the pneumatic cylinder 122 moves into the cylinder thereof. The slide 118 is thereby upwardly displaced to the maximum extent so that the teeth or needles 118a engage in the corresponding slots or grooves in the head 42c and will at this instant be to the rear of the mass of bristles 45. Pressure is then admitted to the pneumatic cylinder 124, so that the latter brings about the entrainment of the assembly, i.e., the plate 121, the slide 118, the lever 119, 119a and the pneumatic cylinder 122 in the direction $f_5$. Consequently the needles 118a exert a thrust on the portion of the mass contained between them and the abutment 46.

The head 42c is then locked by 44b at 42d. It is then possible to replenish the magazine 44 with a fresh quantity of bristles. Meanwhile the machine continues to be supplied from the mass of bristles urged by the needles 118a. When the replenishment of the magazine has been completed, the head 42 is freed and resumes its function in the entrainment of the mass of bristles. The pneumatic cylinder 122 is put under pressure so as to bring the withdrawal of the needles 118a from the mass of the bristles 45. During the disengagement travel of the needles 118a, the pneumatic cylinder 124 is connected to atmosphere on two faces of its piston to render it inoperative and to prevent any possibility of displacement of the needles in the direction $f_5$ or in the opposite direction. In this way any risk of damage to the needles in the mass of pressed bristles is avoided. Above all, any risk of damage to the bristles and any alteration of the uniformity of parallelism of the brushes is also avoided.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

What is claimed is:

1. In a brushmaking machine adapted for simultaneously inserting tufts of bristles into each hole of a row of holes in the head of a fixedly supported brush blank and securing said tufts of bristles by means of keys severed from a single flat wire, the combination comprising: an interchangeable inserting mouthpiece provided with as many insertion channels as there are holes to be filled in a row, said channels extending vertically and opening in the lower part of said mouthpiece along a path similar to the center line of the row of holes and spaced along said line at the same pitch as said holes, said mouthpiece having in its top portion grooves extending in a direction transverse to the direction of the row of holes, each of said grooves intersecting one of said channels, the intersections of said channels and said grooves being located along a straight line at right angles to said grooves, said mouthpiece having further in its top portion a pair of spaced parallel slots extending at right angles to the above-recited grooves; a magazine containing parallel and horizontally disposed bristles, pushing means located in said magazine for urging said bristles upwardly, a notched needle movable longitudinally in a transverse direction over an exit of said magazine, a lower edge of said needle having as many notches as the head of the brush blank has holes in the row to be filled, said notches being spaced to the same pitch as said holes; means cooperating with said notched needle for assuring the penetration of bristles into said notches and the formation of uniform bundles of bristles in said notches; means for displacing said needle longitudinally and transferring said bundles of bristles from the magazine to a position wherein each of them is located above one groove of said mouthpiece; a moving carriage comprising a pair of parallel rails spaced at the same spacing as the parallel slots in the mouthpiece; and located on either side of said notched needle, said carriage being adapted to be moved from an upper position wherein said rails support the bristle bundles engaged in the notches of said needle to a low position wherein said rails are received into said slots of the inserting mouthpiece and the bundles of bristles into the grooves of the top portion of said mouthpiece; means for adjusting the position of the inserting mouthpiece relative to the position of the row to be provided with tufts; means for simultaneously cutting from a continuous flat wire, keys for securing all the tufts of one row in position; means for applying each of said keys against one bundle of bristles substantially in the middle portion thereof to bend said bundles of bristles to move them into said inserting channels, and to insert the looped ends of said tufts encompassing said keys into the holes of said brush head.

2. A brushmaking machine as claimed in claim 1 further comprising a base, a pedestal mounted on said base, a first machine carrying plate slidable on said pedestal in one direction and adapted to be maintained in position by a locking means, a second plate which is mobile relative to said first plate in the vertical direction only by means of simultaneously actuated screw jacks, and a third plate slidable in a direction perpendicular to said one direction, said third plate carrying a central pivot cooperating with a circular portion of the second plate for limited rotation of the third plate relative to the second plate, means for locking said superposed plates in the relative positions whereby the position of the inserted mouthpiece relative to the row of apertures to be provided with tufts may be adjusted.

3. An interchangeable inserting mouthpiece for use with a machine as claimed in claim 1 wherein all the inlets and outlets of said insertion channels are disposed in the same vertical plane passing through the axis of the holes in said brush blank.

4. An interchangeable inserting mouthpiece for use with a machine as claimed in claim 1 wherein the outlets of said insertion channels for the openings located at each end of the row are located in the same vertical plane as the inlets of said channels while the other insertion channels located between said end channels have a curved profile such that the outlets of said insertion channels are disposed along an arcuate line of the holes in said brush blank.

5. A machine as claimed in claim 1 wherein an abutting rail cooperating with said notched needle extends parallelly to said needle at the exit of said magazine, said rail having its lower side at a level lower than the bottoms of the notches in the needle but higher than the lower side of said needle to provide an outlet passage for the bristles trapped in said notches and controlling the dimensions of the bundles of bristles carried by said needle.

6. A machine as claimed in claim 1 wherein said needle is operated by means of a mechanism comprising a cam surface, a follower contacting said cam surface and linking means coupled to said follower and said needle for imparting to said needle a motion in a direction generally longitudinal thereof, said cam surface being adapted to impart to said needle, in addition to its general motion, a series of small alternated movements assurring penetration of bristles in said notches and the formation of uniform bundles therein.

7. A machine as claimed in claim 1 wherein said moving carriage comprises a vertically disposed plate provided with a pair of lateral upper extensions and a pair of lateral lower extensions at right angles to said plate and parallelly disposed, said lower extensions supporting said parallel rails arranged for engaging into the parallel slots of said mouthpiece, said upper extensions supporting counterrails respectively in parallel relationship to said rail and defining with said rails a passage for the bundles of bristles carried by said notched needle; said vertically disposed plate being adapted for sliding vertically inside said tail portion of said mouthpiece and being urged downward by spring means arranged in said tail portion; a catch device comprising a pair of stops secured to said vertical plate and a slide provided in its upper face with a pair of notches spaced the same distance as said stops, said stops bearing against the upper face of said slide in the high position of said carriage; a pivoting lever connected at one extremity to said slide, spring means acting between said slide and a fixed abutment for maintaining said slots in said slide out of alignment with said stops, and an adjusting screw secured to the second end of said pivoting lever, said screw being located in a position to be operated by said notched needle at the end of the traveling movement thereof for aligning said stops and said notches of said slide and allowing said moving carriage to be moved downwardly under the action of said spring means arranged in said tail portion for transferring the bundles of bristles from said needle into the transverse grooves of said mouthpiece.

8. A machine as claimed in claim 1 wherein said magazine comprises an arcuate member of a U-shaped section having its open side vertically disposed towards the front of the machine, the center axis of said arcuate member being horizontally disposed and at right angles to said notched needle; an arm supporting a counterweight mounted on a pivot having for axis the center axis of said arcuate member, said arm having a lower portion bent to a circular shape on the same radius as said arcuate member; a head formed at the extremity of said arm opposite to said counterweight and engaged in said arcuate member for pushing the bristles disposed horizontally in said arcuate member with one of their extremities abutting the web portion of said U-shaped member; the extremity of said arcuate U-shaped member remote from said counterweight forming an exit aperture disposed in a horizontal plane adjacent to said mouthpiece; whereby said bristles are urged upwardly through said exit aperture by said arcuate arm under the action of said counterweight.

9. A brushmaking machine as claimed in claim 8 wherein a vertical rear wall of the magazine against which the bristles bear is adjustable relative to the front wall thereof.

10. A machine as claimed in claim 8 comprising an auxiliary device for urging said bristles towards said magazine exit during refilling of said magazine with bristles, said device comprising a base plate slidingly mounted below said magazine; a slide carried on said base plate; a bell-crank lever pivoted on said base plate having one extremity pivotally connected to said slide; a pneumatic cylinder having one extremity pivotally connected to said base plate and the other extremity pivotally connected to the second extremity of said bell-crank lever, said slide being provided with a series of blades protruding in the direction of said magazine in a fork-like manner for engagement in the mass of bristles through parallel slots provided in the adjacent wall of said magazine when said pneumatic cylinder is pressurized; and a second pneumatic cylinder pivoted on the frame of the machine and adapted for urging said base plate, and the members mounted thereon, in the direction of the exit of said magazine when it is pressurized.

11. A machine as claimed in claim 1 comprising a suitable frame and guide ways therein and wherein said interchangeable mouthpiece has at least one tail portion laterally disposed and extending at right angles from said body portion, said tail portion being resiliently secured to a mobile part vertically slidable for an up-and-down motion on said guide ways, said mobile part having a row of vertically disposed conduits respectively in alignment with the insertion channels in said mouthpiece; a spindle in parallel relationship to said slots of said mouthpiece; means for driving said spindle in an up-and-down motion and for vertically sliding said mobile part; said key applying means comprising flat tongues secured to said spindle and located respectively in said conduits of said mobile part for vertical sliding therein.

12. A machine as claimed in claim 11 wherein the inserting tongues are elongated blades of high resistance spring steel, said tongues having in their lower portion a flat section substantially oriented with its longer sides parallel to the slots of said mouthpiece, the upper portion of said tongues being enlarged in a direction substantially at right angles to said slots and being notched adjacent their upper extremity in one side enlargement; said spindle having formed therein a vertically disposed diametral slit, said tongues passing through said slit and being maintained in parallel relationship by means of washers slidably engaged on said spindle, a locking stud protruding from one face of each said washers, and engaged in the notch of the adjacent tongue, and said tongues being secured in position by a screw cap screwed in a tapped hole provided in the extremity of said spindle.

13. A brushmaking machine as claimed in claim 12 wherein said movable part carrying the mouthpiece comprises a plurality of closely adjacent removable members in which are machined the tongue guiding channels.

14. A machine as claimed in claim 11 wherein said inserting channels are enlarged adjacent the transverse grooves of said mouthpiece.

15. A machine as claimed in claim 11 wherein the means for moving said spindle in an up-and-down motion comprises a crank arm secured to the main shaft of the machine, a crank pin on said crank arm, a connecting link pivoted about said crank pin; said connecting link having in its small end an eccentric bearing driving said spindle, said eccentric bearing being rotated on said small end of said connecting link to provide an acute control of the positions of the lower ends of said tongues when occupying their inserting positions.

16. A brushmaking machine as claimed in claim 11 wherein springs are interposed between said inserting mouthpiece and said mobile part so as to provide a small space between these members in the inoperative state.

17. A machine as claimed in claim 11 wherein said means for simultaneously cutting said keys comprises a punching tool arranged in said mobile part, said punching tool comprising a block carrying a series of punches and sliding opposite a counterpart provided with punching holes, the number of punches and punching holes being greater by one unit than the number of holes to be filled, said punches and counterpart being located on opposite sides of a guiding conduit for said flat wire, said guiding conduit intersecting the vertical conduits provided in said mobile part at a level lower than the lower extremities of said flat tongues when said tongues are in their upper positions; spring means urging said block away from said counterpart, and cam operated lever means for moving the punches against said flat wire whereby said punches cut portions of said wire which are expelled from the punching tool leaving between them key portions located in alignment with the vertical conduits provided in the mobile part and below said flat tongue.

18. A machine as claimed in claim 17 wherein a transverse channel is formed in said mobile inserting piece parallel and adjacent to the exit of said punching holes, a rotary brush mounted in said channel adjacent to said orifices, and means provided for rotating said brush to remove the waste material cut in said wire by said punches.

19. A machine as claimed in claim 17 wherein a reel having the flat wire wound thereon is loosely mounted on a support shaft; braking means provided for controlling the rotation of said reel; and feeding means for unwinding said flat wire and feed it into said guiding conduit, said feeding means comprising a pair of small wheels having conjugated circular bosses on a portion of the outer periphery thereof, said bosses having a circumferential length equal to the length of wire necessary for forming the keys of one row of tufts; means for rotating said wheels in synchronism with the main shaft of the machine, whereby circular bosses cooperate for gripping said flat wire therebetween and intermittently feed a predetermined length of wire into said guiding conduit.

References Cited by the Examiner

UNITED STATES PATENTS

| | | | |
|---|---|---|---|
| 423,508 | 3/1890 | Young | 300—5 |
| 544,201 | 8/1895 | Young | 300—5 |
| 1,141,398 | 6/1915 | Kress | 300—5 |
| 1,736,162 | 11/1929 | Lindstrom | 300—5 |

GRANVILLE Y. CUSTER, JR., *Primary Examiner.*